(12) United States Patent
Mochizuki

(10) Patent No.: US 9,174,683 B2
(45) Date of Patent: Nov. 3, 2015

(54) FLOOR REINFORCEMENT STRUCTURE FOR VEHICLE BODY

(75) Inventor: Shinei Mochizuki, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 14/241,608

(22) PCT Filed: May 16, 2012

(86) PCT No.: PCT/JP2012/062455
§ 371 (c)(1),
(2), (4) Date: Feb. 27, 2014

(87) PCT Pub. No.: WO2013/054563
PCT Pub. Date: Apr. 18, 2013

(65) Prior Publication Data
US 2014/0203595 A1    Jul. 24, 2014

(30) Foreign Application Priority Data
Oct. 11, 2011    (JP) .................................. 2011-223900

(51) Int. Cl.
*B62D 25/20*    (2006.01)
(52) U.S. Cl.
CPC ............ *B62D 25/2027* (2013.01); *B62D 25/20* (2013.01)
(58) Field of Classification Search
CPC ............... B62D 25/20; B62D 25/2009; B62D 25/2027; B62D 25/2036
USPC ................................ 296/193.07, 203.01, 204
See application file for complete search history.

(56) References Cited

FOREIGN PATENT DOCUMENTS

| JP | 56084477 U | 7/1981 |
| JP | 2000272544 A | 10/2000 |
| JP | 2002019643 A | 1/2002 |
| JP | 2007276612 A | 10/2007 |
| JP | 2008074335 A | 4/2008 |
| JP | 2009107424 A | 5/2009 |
| JP | 2011121483 A | 6/2011 |

OTHER PUBLICATIONS

International Search Report for Application No. PCT/JP2012/062455 dated Aug. 14, 2012.

*Primary Examiner* — H Gutman
(74) *Attorney, Agent, or Firm* — Lerner, David, Littenberg, Krumholz & Mentlik, LLP

(57) ABSTRACT

The invention includes a floor reinforcement structure for vehicle body providing rigidity to an area around a main and rear floor joint; improving vehicle-body rigidity and rigidity against floor shaking and associated vehicle interior noise; and improving vehicle running stability. A floor reinforcement structure includes: a main floor; rear floor; side sill; a floor tunnel with a hat-like cross-section protruding from the floor and located medially in the main floor in the vehicle width direction and extending in a front-and-rear direction; and a vertical wall at the front of the rear floor extending in a vehicle vertical direction. The vertical wall is continuous with no steps The height of a top face thereof is larger than twice the height of a top face of the side sill, which is more than twice the height of a top face of a rear end portion of the floor tunnel.

6 Claims, 3 Drawing Sheets

FLOOR REINFORCEMENT STRUCTURE FOR VEHICLE BODY

CROSS REFERENCE TO RELATED APPLICATIONS

The present application is a national phase entry under 35 U.S.C. §371 of International Application No. PCT/JP2012/062455, filed May 16, 2012, published in Japanese, which claims priority from Japanese Patent Application No. 2011-223900 filed Oct. 11, 2011, all of which are hereby incorporated herein by reference.

TECHNICAL FIELD

The present invention relates to a floor reinforcement structure for vehicle body.

BACKGROUND ART

Conventionally, a floor of a vehicle body of a vehicle such as an automobile includes a main floor and a rear floor which are provided in front and rear sides of the vehicle, and a side sill extending in the vehicle front-and-rear direction is provided in each of left and right sides of the floor in a vehicle-width direction. In addition, a floor tunnel projecting in the upper direction of the vehicle and having a hat-like cross section is provided at a middle portion of the main floor in the vehicle width direction and extends in the vehicle front-and-rear direction. A vertical wall extending in a vehicle vertical direction is formed at a front side of the rear floor (see, for example, Patent Document 1).

In such a vehicle floor structure, steps are provided to the vertical wall of the rear floor in order to form a mount board for a rear seat and a projecting part for housing a fuel tank located in a lower position in the vehicle and to improve productivity. Further, for layout reasons, the height of the vertical wall of the rear floor is lower at the floor tunnel. Additionally, for reasons of layout for exhaust pipe arrangement, a rear end portion of the floor tunnel has a trumpet shape.

In some of conventional vehicles, the height of the rear portion of the floor tunnel is reduced gradually toward the rear of the vehicle in order to expand a foot space for the passenger sitting in the rear seat (see, for example, Patent Document 2).

PRIOR ART DOCUMENTS

[Patent Document 1] Japanese Patent Application Publication No. 2009-107424

[Patent Document 1] Japanese Patent Application Publication No. 2008-74335

SUMMARY OF THE INVENTION

Problems to be Solved by the Invention

In the floor structure of Patent Document 1 described above, however, the step provided to the vertical wall of the rear floor forms a deformation margin in the vertical wall, and might lead to lowering of the rigidity against floor shaking and the rigidity of the vehicle body. Moreover, since the height of the vertical wall of the rear floor is low at the portion where the floor tunnel is joined, similar problems might arise concerning the rigidity against floor shaking and the vehicle-body rigidity. Further, the trumpet shape of the rear end portion of the floor tunnel reduces the lateral area of the vertical wall, weakening the rigidity against floor shaking and the vehicle-body rigidity, possibly causing troubles such as generation of shaking and deformation.

In the floor structure of Patent Document 2 described above, on the other hand, the gradual reduction in the height of the rear end portion of the floor tunnel toward the rear of the vehicle might lower the rigidity of the floor tunnel, leading to decrease in the local rigidity of the floor and in the rigidity of the seat bracket support.

The present invention has been made in consideration of such circumstances, and aims to provide a floor reinforcement structure for vehicle body which can achieve reduction in vehicle interior noise generated due to floor shaking and improvement in vehicle running stability by providing rigidity to an area around a joint portion between a main floor and a rear floor to thereby improve the vehicle-body rigidity and the rigidity against floor shaking.

Means for Solving the Problems

In order to solve the above problem in the conventional technique, the present invention provides a floor reinforcement structure for vehicle body, comprising: a main floor and a rear floor provided in a vehicle front-and-rear direction; a side sill being provided at each of left and right sides of the main floor and the rear floor in a vehicle width direction, and extending in the vehicle front-and-rear direction; a floor tunnel of a hat-like cross-sectional shape protruding in the upper direction of the vehicle, the floor tunnel being provided at a middle portion of the main floor in the vehicle width direction and extending in the vehicle front-and-rear direction; and a vertical wall being formed at a front side of the rear floor and extending in a vehicle vertical direction, wherein the vertical wall of the rear floor is formed into a continuous shape having no steps, a half of a height of a top face of the vertical wall of the rear floor is larger than a height of a top face of the side sill, and a half of the height of the top face of the side sill is larger than a height of a top face of the floor tunnel.

Moreover, in the present invention, a top edge of the vertical wall of the rear floor is formed into a curved shape bulging in an upper direction of the vehicle.

Furthermore, in the present invention, the rear floor is provided with a projecting part for a fuel tank, and the projecting part and the vertical wall of the rear floor are formed continuously in the vehicle vertical direction.

Additionally, in the present invention, left and right leg portions of a rear end portion of the floor tunnel extend in a lower direction of the vehicle, and the extended parts of the leg portions are bent into crank shapes.

Besides, in the present invention, the rear end portion of the floor tunnel is formed with a panel member which is a separate component from the floor tunnel.

Effects of the Invention

As described above, the floor reinforcement structure for vehicle body of the present invention includes: a main floor and a rear floor provided in a vehicle front-and-rear direction; a side sill being provided at each of left and right sides of the main floor and the rear floor in a vehicle width direction and extending in the vehicle front-and-rear direction; a floor tunnel of a hat-like cross-sectional shape protruding in the upper direction of the vehicle, the floor tunnel being provided at a middle portion of the main floor in the vehicle width direction and extending in the vehicle front-and-rear direction; and a vertical wall being formed at a front side of the rear floor and extending in a vehicle vertical direction. In this floor reinforcement structure for vehicle body, the vertical wall of the rear floor is formed into a continuous shape having no steps; a half of a height of a top face of the vertical wall of the rear floor is larger than a height of a top face of the side sill; and a half of the height of the top face of the side sill is larger than a height of a top face of the floor tunnel. Accordingly, reduction in the height of the floor tunnel can provide larger height, without any steps, to the vertical wall of the rear floor above the floor tunnel.

Therefore, according to the floor reinforcement structure of the present invention, rigidity can be provided to the area around the joint portion between the main floor and the rear floor, allowing improvement in the overall rigidity of the vehicle and provision of rigidity for lowering the floor shaking in the vehicle vertical direction. The rigidity thus provided can reduce vehicle interior noise generated due to floor shaking and improve vehicle running stability.

Further, in the present invention, since the top edge of the vertical wall of the rear floor is formed into a curved shape bulging in an upper direction of the vehicle, the effective height of the vertical wall of the rear floor located above the floor tunnel can be earned to decrease the oscillation of the floor shaking in the vehicle vertical direction and to improve the floor rigidity.

Additionally, in the present invention, the rear floor is provided with a projecting part for a fuel tank, and the projecting part and the vertical wall of the rear floor are formed continuously in the vehicle vertical direction. Accordingly, all the height of the vertical wall of the rear floor can be effectively used to obtain similar effects to the ones of the invention described above.

Moreover, in the present invention, left and right leg portions of a rear end portion of the floor tunnel extend in a lower direction of the vehicle, and the extended parts of the leg portions are bent into crank shapes. Accordingly, the extended parts of the leg portions allow the effective height of the floor tunnel to be maintained even if the height of the rear end portion of the floor tunnel is reduced. Consequently, lowering of the rigidity of the floor tunnel can be avoided.

Furthermore, in the present invention, since the rear end portion of the floor tunnel is formed with a panel member which is a separate component from the floor tunnel, the local rigidity of the rear end portion of the floor tunnel can be provided. Additionally, in a case where the crank-shaped extended parts are provided only to the leg portions of the panel member, which is a separate component, and not to the main part of the floor tunnel, the rear end portion, which is difficult to form, can be fabricated separately from the tunnel body, so that the panel member can be formed thicker than the tunnel body. This allows dual achievement of formability and rigidity of the floor.

MODE FOR CARRYING OUT THE INVENTION

Figure 1:
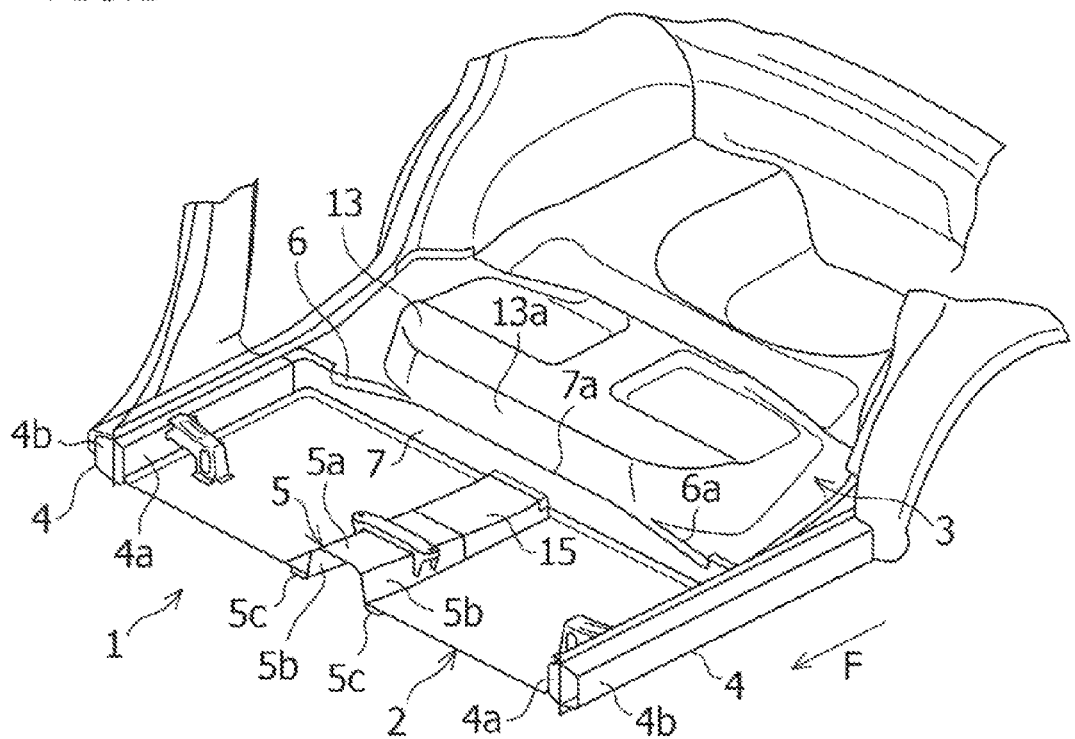
FIG. 1 is a perspective view of a vehicle floor to which a reinforcement structure according to an embodiment of the present invention is applied, the view being seen diagonally from upper front.

A detailed description of the present invention will be given below based on an embodiment shown in the drawings.

FIGS. 1 to 5 show a floor reinforcement structure for vehicle body according to the embodiment of the present invention.

As shown in FIGS. 1 to 5, a floor 1 of a vehicle body of a vehicle according to the embodiment of the present invention includes a main floor 2 and a rear floor 3 which are provided in a vehicle front-and-rear direction. A rear end portion of the main floor 2 and a front end portion of the rear floor 3 are joined to each other in an overlapping manner. A side sill 4 is provided at each of left and right sides of the floor 1 in a vehicle width direction, and extends in the vehicle front-and-rear direction. The side sill 4 includes a side sill inner panel 4a and a side sill outer panel 4b joined to each other, and has a closed cross section.

A floor tunnel 5 is provided at a middle portion of the main floor 2 in the vehicle width direction, and extends in the vehicle front-and-rear direction. The front tunnel 5 has a hat-like cross section protruding in the upper direction of the vehicle. In addition, a vertical wall 6 extending in a vehicle vertical direction is formed at a front side of the rear floor 3. Note that an arrow F in FIGS. 1 and 2 denotes the front of the vehicle.

Figure 2:
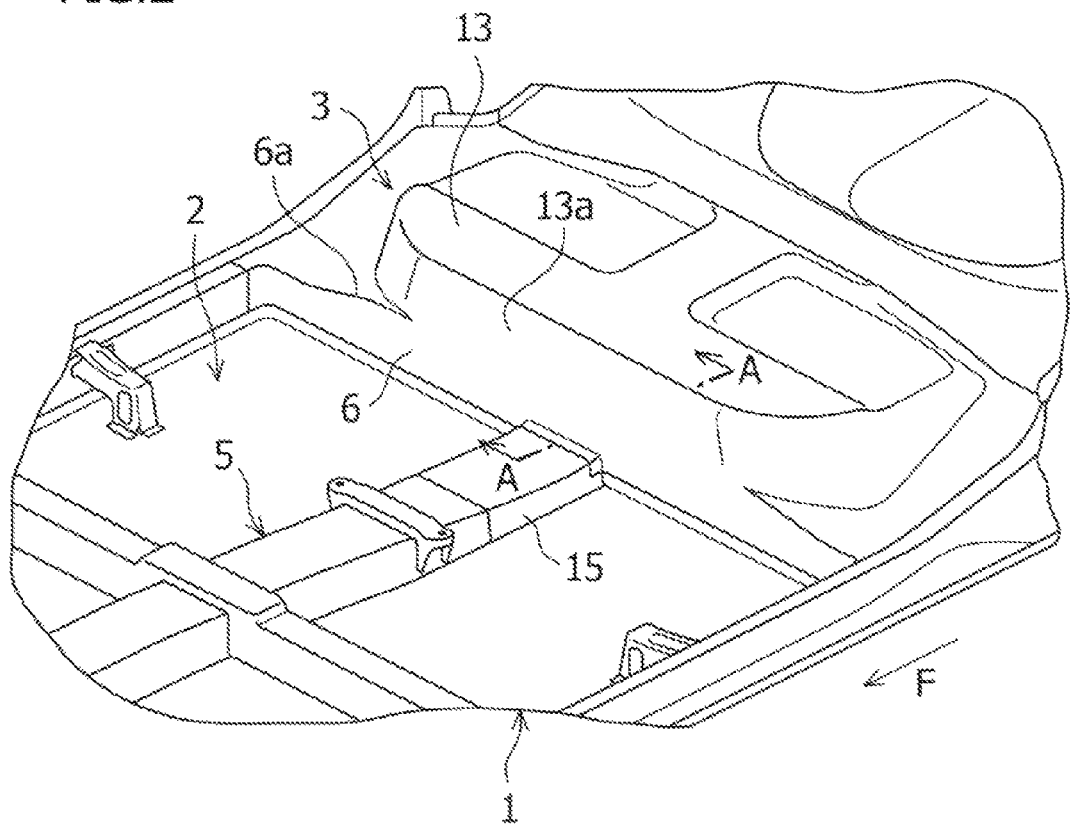
FIG. 2 is a perspective view showing the vehicle floor in FIG. 1 with a cross member being detached from a vertical wall of a rear floor.
Figure 4:
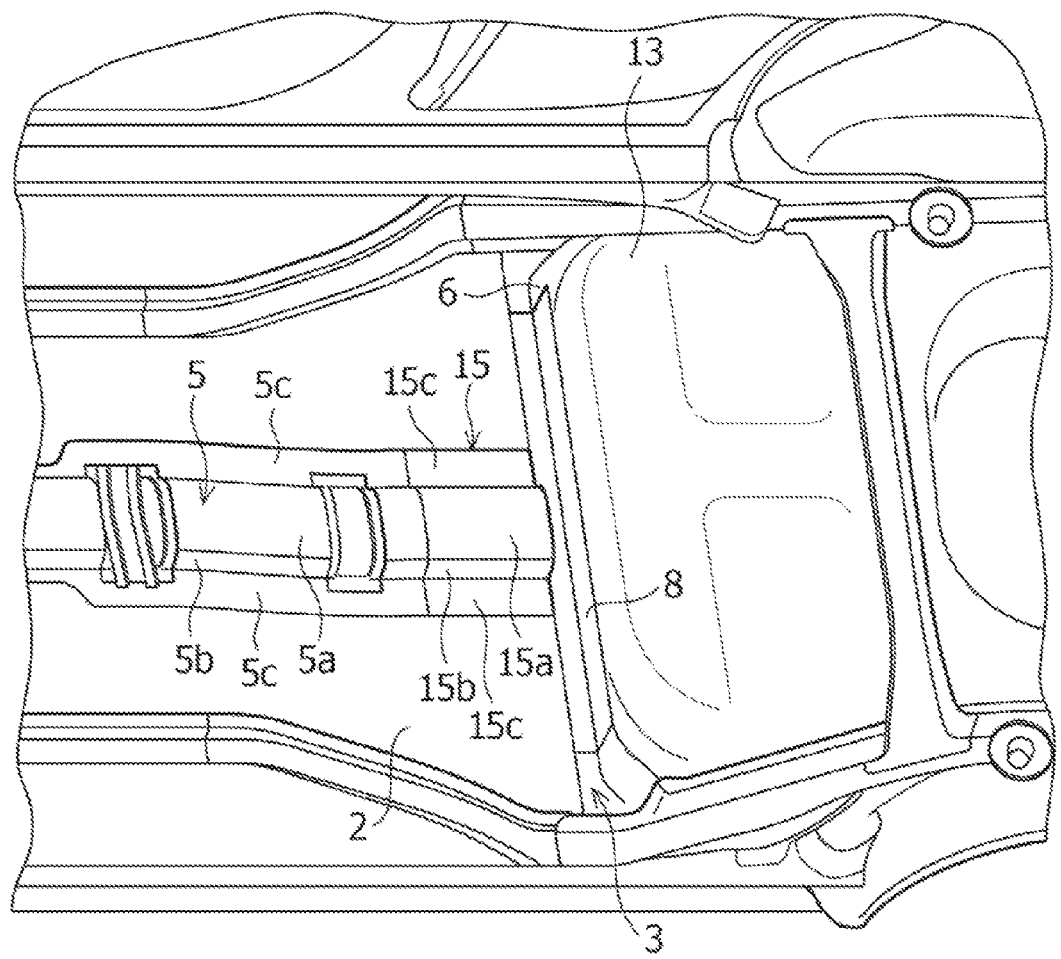
FIG. 4 is a perspective view showing the vehicle floor in FIG. 1 diagonally from rear and lower left.

As FIGS. 1, 2, and 4 show, a tunnel body part of the floor tunnel 5, i.e., a portion besides a rear end portion 15, has a hat-like cross section including a top surface portion 5a, left and right leg portions 5b, and flange portions 5c. The left and right leg portions 5b extend downward from left and right edge portions of the top surface portion 5a, respectively, and face each other. The flange portions 5c are formed by bending lower edges of the leg portions 5b outward at right angles. The floor tunnel 5 is fixed to the main floor 2 by overlapping and joining together joint flanges 2a (see FIG. 5) of the main floor 2 and the leg portions 5b of the floor tunnel 5, respectively, and by overlapping and joining together a lower surface of the main floor 2 and the flange portions 5c of the floor tunnel 5.

Figure 3:
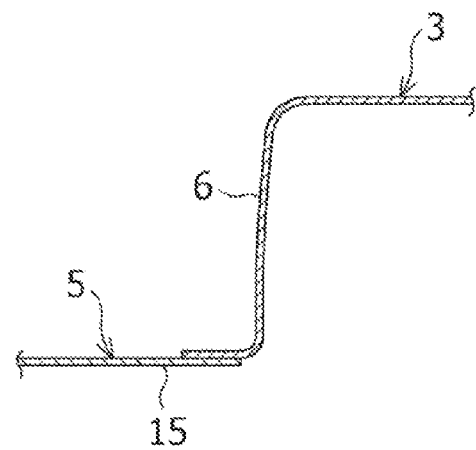
FIG. 3 is a cross sectional view taken along an A-A line in FIG. 2.
Figure 5:
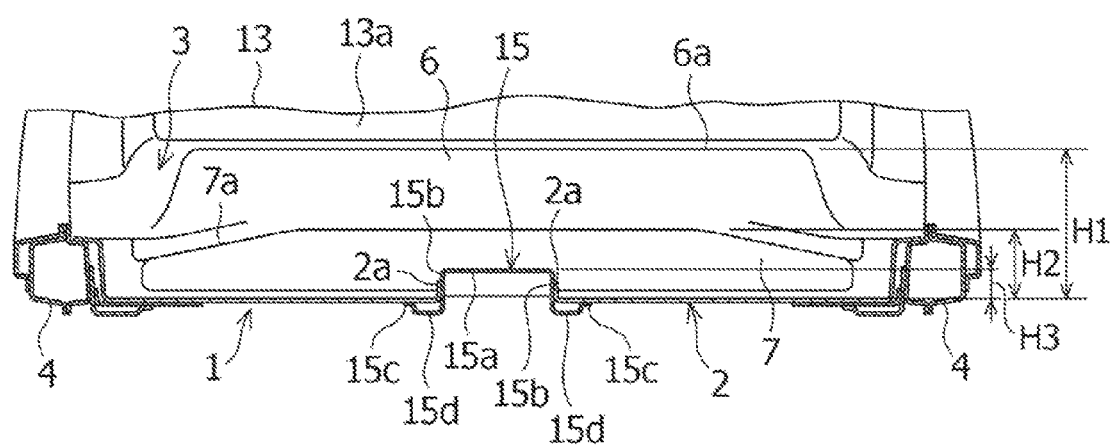
FIG. 5 is a partially-cross-sectional front view showing the vehicle floor in FIG. 1 from the front of the vehicle.

As is almost similar to the tunnel body part, the rear end portion 15 of the floor tunnel 5 of the present embodiment also has a hat-like cross section including top surface portion 15a, left and right leg portions 15b, and flange portions 15c. However, as will be described later, the rear end portion 15 is lower than the tunnel body part so that the vertical wall 6 of the rear floor 3 may be provided with a large height. For this reason, as shown in FIGS. 3 and 5, the top surface portion 15a and the left and right leg portions 15b of the rear end portion 15 of the floor tunnel 5 of the present embodiment extend straight rearward toward, and are joined to, the vertical wall 6 of the rear floor 3. Although the joint portion between the rear end portion 15 of the floor tunnel 5 and the vertical wall 6 of the rear floor 3 usually has a fan-like curved shape so as to lessen local stress, the top surface portion 15a extends straight in order to reduce the tunnel height as much as possible. Moreover, the left and right leg portions 15b do not extend outward so that the vertical wall 6 extending in the upper direction of the vehicle from the floor surface may be provided with as large area as possible.

Further, as shown in FIG. 5, the left and right leg portions 15b of the rear end portion 15 of the floor tunnel 5 extend in a lower direction of the vehicle, and the extended parts of the leg portions 15b thus formed are bent into crank shapes with the flange portions 15c. Bead portions 15d are provided at lower portions of the rear end portion 15 thus lowered, to give the floor tunnel 5 a larger effective height. This can prevent lowering of the rigidity of the floor tunnel 5, the local rigidity of the floor, and the rigidity of the seat bracket suspension.

Note that, in the case where the floor tunnel 5 becomes lower and lower to the rear of the vehicle, it is effective that the bead portions 15d become higher and higher accordingly so as to maintain the overall height. In the present embodiment, as shown in FIG. 4, the rear end portion 15 extending from the middle of the floor tunnel 5 has a uniform height.

In the floor reinforcement structure of the present embodiment, the rear end portion 15 of the floor tunnel 5 is formed with a panel member which is a separate component from the tunnel body part of the floor tunnel 5. As this panel member, a rigid member thicker than the tunnel body is used to give local rigidity to the rear end portion 15 of the floor tunnel 5. It is also possible to provide the bead portions 15d only to the panel member, which is the separate member provided as the rear end portion 15 of the floor tunnel 5, and not to the tunnel body part. In this way, in the floor reinforcement structure of the present embodiment, the rear end portion 15 of the floor tunnel 5, which is difficult to form, can be fabricated separately from the tunnel body part, so that the panel member can be formed thicker than the tunnel body. This allows dual achievement of the formability and the rigidity of the floor 1.

Further, as FIGS. 1 to 5 show, the vertical wall 6 of the rear floor 3 of the present embodiment is formed as a continuous flat surface having no steps, and a top edge 6a of the vertical wall 6 is formed into a curved shape bulging in the upper direction of the vehicle (an arched shape projecting upward). In this way, the height of the vertical wall 6 reduced by the floor tunnel 5 is compensated. Moreover, as FIG. 5 shows, above the floor tunnel 5, a half of a height H1 of the top face of the vertical wall 6 of the rear floor 3 is larger than a height H2 of a top face of the side sill 4, and a half of the height H2 of the top face of the side sill 4 is larger than a height H3 of a top face of the floor tunnel 5. Accordingly, even above the floor tunnel 5, the height H1 of the top face of the vertical wall 6 of the rear floor 3 is large.

As shown in FIGS. 1, 2, and 5, the rear floor 3 is provided with a projecting part 13 for a fuel tank, and a front face 13a of the projecting part 13 and the vertical wall 6 of the rear floor 3 are continuously formed in the vehicle vertical direction, especially in an area near the floor tunnel 5. The floor reinforcement structure of the present embodiment is thus configured to effectively use all the height of the vertical wall 6 of the rear floor 3.

As FIGS. 1 and 5 show, a cross member 7 is provided at a front side of the vertical wall 6 of the rear floor 3 and extends in the vehicle-width direction. Above the floor tunnel 5, a lower edge of the cross member 7 is located lower than the top surface portion 15a of the rear end portion 15 of the floor tunnel 5, and a top edge 7a of the cross member 7 is formed into a curved shape bulging in the upper direction of the vehicle (an arched shape projecting upward) along the top edge 6a of the vertical wall 6. Thereby, from the top surface portion 15a of the rear end portion 15 of the floor tunnel 5 to the top edge 6a of the vertical wall 6 of the rear floor 3, a large height is provided to improve the vehicle rigidity. In addition, as shown in FIG. 4, in the case of providing a reinforcement member 8, extending in the vehicle-width direction, at a backside of the vertical wall 6, the reinforcement member 8 can cover an area from the top surface portion 15a of the rear end portion 15 of the floor tunnel 5 to the top edge 6a of the vertical wall 6 of the rear floor 3, such area largely contributing to the rigidity improvement.

As described thus far, in the floor reinforcement structure for vehicle body according to the embodiment of the present invention, since the vertical wall 6 of the rear floor 3 is formed as a continuous flat surface having no steps, the vertical wall 6 can have a larger height than a vertical wall 6 having a step at a position in the middle of the vertical wall 6 in the vertical direction. The vertical wall 6 having a larger height functions against the vertical shaking of the vehicle, achieving reduction in the shaking level and improvement in the vehicle rigidity.

Further, in the floor reinforcement structure of the present embodiment, above the floor tunnel 5, a half of the height H1 of the top face of the vertical wall 6 of the rear floor 3 is larger than the height H2 of the top face of the side sill 4, and a half of the height H2 of the top face of the side sill 4 is larger than the height H3 of the top face of the floor tunnel 5. Accordingly, the vertical wall 6 is high at a location experiencing the largest oscillation level of shaking in the vehicle vertical direction. Consequently, the rigidity around the joint portion between the main floor 2 and the rear floor 3 is obtained, and the oscillation level of the vertical shaking can be reduced. For these reasons, according to the floor reinforcement structure of the present embodiment, vehicle interior noise generated due to floor shaking can be reduced, and vehicle running stability can be improved.

Furthermore, since the floor reinforcement structure of the present embodiment allows reduction in the width of the rear end portion 15 of the floor tunnel 5 and increase in the lateral width of the vertical wall 6 of the rear floor 3 in the vehicle width direction, the oscillation of the vertical shaking can be further decreased by increasing an area where the vertical wall 6 is high.

The embodiment of the present invention has been described above. However, the present invention is not limited to the embodiment described, and can be variously modified or changed based on the technical concept of the present invention.

EXPLANATION OF THE REFERENCE NUMERALS 1 floor
2 main floor
3 rear floor
4 side sills
5 floor tunnel
5a top surface portion
5b leg portions
5c flange portions
6 vertical wall of rear floor
6a top edge of vertical wall
13 projecting part for fuel tank
13a front face of projecting part
15 rear end portion of floor tunnel
15a top surface portion
15b leg portions
15c flange portions
15d bead portions
H1 height of top face of vertical wall
H2 height of top face of side sill
H3 height of top face of rear end portion

What is claimed is:
1. A floor reinforcement structure for vehicle body, comprising:
a main floor and a rear floor provided in a vehicle front-and-rear direction;

a side sill being provided at each of left and right sides of the main floor and the rear floor in a vehicle width direction, and extending in the vehicle front-and-rear direction;

a floor tunnel of a hat-like cross-sectional shape protruding in an upper direction of the vehicle, the floor tunnel being provided at a middle portion of the main floor in the vehicle width direction and extending in the vehicle front-and-rear direction; and a vertical wall being formed at a front side of the rear floor and extending in a vehicle vertical direction, wherein left and right leg portions of a rear end portion of the floor tunnel extend in a lower direction of the vehicle and extended parts of the left and right leg portions are bent into crank shapes; and wherein the rear end portion of the floor tunnel is lower than a tunnel body part and bead portions are provided at lower portions of the rear end portion thus lowered.

2. The floor reinforcement structure for vehicle body according to claim 1, wherein a top edge of the vertical wall of the rear floor is formed into a curved shape bulging in the upper direction of the vehicle.

3. The floor reinforcement structure for vehicle body according to claim 1, wherein the rear floor is provided with a projecting part for a fuel tank, and the projecting part and the vertical wall of the rear floor are formed continuously in the vehicle vertical direction.

4. The floor reinforcement structure for vehicle body according to claim 1, wherein the rear end portion of the floor tunnel is formed with a panel member which is a separate component from the floor tunnel.

5. The floor reinforcement structure for vehicle body according to claim 1, wherein the rear end portion of the floor tunnel is formed with a panel member which is a separate component from the floor tunnel.

6. The floor reinforcement structure for vehicle body according to claim 1, wherein the vertical wall of the rear floor is formed into a continuous shape having no steps, a half of a height of a top face of the vertical wall of the rear floor is larger than a height of a top face of the side sill, and a half of the height of the top face of the side sill is larger than a height of a top face of the floor tunnel.

* * * * *